(12) United States Patent
Phillips, Jr.

(10) Patent No.: US 11,571,819 B1
(45) Date of Patent: Feb. 7, 2023

(54) SYSTEM FOR AN INSERT FOR HOLDING A TUMBLER WHILE SPINNING DURING DECORATION

(71) Applicant: Michael F. Phillips, Jr., Chula Vista, CA (US)

(72) Inventor: Michael F. Phillips, Jr., Chula Vista, CA (US)

( * ) Notice: Subject to any disclaimer, the term of this patent is extended or adjusted under 35 U.S.C. 154(b) by 0 days.

(21) Appl. No.: 17/712,610

(22) Filed: Apr. 4, 2022

(51) Int. Cl.
*B25J 15/02* (2006.01)
*B25J 15/00* (2006.01)
*B25J 15/12* (2006.01)

(52) U.S. Cl.
CPC ........... *B25J 15/0047* (2013.01); *B25J 15/12* (2013.01)

(58) Field of Classification Search
CPC ........ B25J 15/0047; B25J 15/12; B25J 15/08; B25J 15/103; A47L 13/25
USPC .................................................. 294/93, 99.1
See application file for complete search history.

(56) References Cited

U.S. PATENT DOCUMENTS

| | | | | |
|---|---|---|---|---|
| 157,165 | A * | 11/1874 | Ellsworth | |
| 791,497 | A * | 6/1905 | Putnam | |
| 1,317,500 | A * | 9/1919 | Holmquist | B66C 1/54 |
| | | | | 294/93 |
| 2,529,331 | A | 11/1950 | Ellis et al. | |
| 4,168,073 | A * | 9/1979 | LaRue | F24S 10/45 |
| | | | | 294/93 |
| 4,284,374 | A * | 8/1981 | Senzaki | B23G 5/16 |
| | | | | 408/139 |
| 4,304,398 | A * | 12/1981 | Crowell | B65G 49/061 |
| | | | | 269/95 |
| 4,500,078 | A * | 2/1985 | Brennan | B66C 1/56 |
| | | | | 269/238 |
| 5,324,049 | A | 6/1994 | Mistrater et al. | |
| 5,451,085 | A * | 9/1995 | Wagner | B25G 3/20 |
| | | | | 294/58 |
| 5,658,103 | A * | 8/1997 | Inokuchi | B23B 51/00 |
| | | | | 408/199 |
| 6,142,487 | A * | 11/2000 | Swain | B05C 13/02 |
| | | | | 294/93 |
| 7,452,017 | B2 | 11/2008 | Maffeis | |
| 7,543,348 | B2 | 6/2009 | Le | |
| 7,891,076 | B2 * | 2/2011 | Schmitt | B05C 13/025 |
| | | | | 29/559 |
| 8,770,642 | B1 * | 7/2014 | Jason | B25B 9/02 |
| | | | | 294/93 |
| 9,687,575 | B2 * | 6/2017 | Farren | A61L 2/10 |
| D889,232 | S | 7/2020 | Qin | |
| D906,616 | S | 12/2020 | Li | |

(Continued)

OTHER PUBLICATIONS

"The Original Epoxy Turner Arm Adjustable Bearing Support!," etsy.com. https://www.etsy.com/lisling/873355288/the-original-epoxy-turner-arm-adjustable [Date accessed: Dec. 31, 2021].

(Continued)

*Primary Examiner* — Paul T Chin
(74) *Attorney, Agent, or Firm* — Christopher Mayle; Bold IP, PLLC (57) ABSTRACT

A system and method directed for a tumbler insert which secures a tumbler from the inside without contacting any exterior surfaces, the insert having a plurality of flexible members or claws that may be bent or contracted when pressed into the tumbler, which creates sufficient tension to secure the holder within the vessel.

6 Claims, 7 Drawing Sheets

(56) References Cited

U.S. PATENT DOCUMENTS

| | | | |
|---|---|---|---|
| D915,476 S | 4/2021 | Luo | |
| D936,115 S | 11/2021 | Yang | |
| 2018/0035861 A1 | 2/2018 | Humphrey | |
| 2019/0030711 A1* | 1/2019 | Azazi | ................ B25J 15/10 |

OTHER PUBLICATIONS

"Tumbler Dry Stand | ½" and ¾" PVC | Digital STL," etsy.com. https://www.etsy.com/lisling/1056770566/tumbler-dry-stand-12-and-34-pvc-digital?gpla=1&gao=1& [Date accessed: Dec. 31, 2021].
"Cup /Tumbler Insert—Skinny 20 oz—Cup Turner Accessory," etsy.com. https://www.etsy.com/listing/887409097/cup-tumbler-insert-skinny-20-oz-cup?click_key=6c2191a59c6e234336e61a7c72c179fd6a1055c0%3A887409097&click_sum=1ecd5b6b&ref=sold_out-6&frs=1 [Date accessed: Dec. 31, 2021].

* cited by examiner

SYSTEM FOR AN INSERT FOR HOLDING A TUMBLER WHILE SPINNING DURING DECORATION

FIELD OF DISCLOSURE

The field of disclosure is generally directed to cup inserts and more particularly to a tumbler insert to conform to the interior perimeter of the tumbler to hold the tumbler while on a rotisserie or spinning machine.

BACKGROUND

Glitter tumblers are stainless steel insulated mugs and cups that one may glitter, seal, and decorate. They have become very popular because users can personalize the tumblers with many customizations. Typically, a rotisserie on spinning machine may be used where the tumbler is mounted to the machine with an insert connected to a pipe. However, these inserts are often fragile and do not conform to all shapes of tumblers. Thus exists the need for a new tumbler insert.

SUMMARY

The disclosure presented herein relates to an expandable gripping device that secures an open top tumbler or cup from its inside surface. The expandable claw supports and grips the interior surface of the container via a compressor or spring mechanism. The gripping elements are attached to a handle so that a cup can be rotated and painted without touching its exterior surfaces.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

In the Summary above and in this Detailed Description, and the claims below, and in the accompanying drawings, reference is made to particular features of the invention. The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined).

"Exemplary" is used herein to mean "serving as an example, instance, or illustration." Any aspect described in this document as "exemplary" is not necessarily to be construed as preferred or advantageous over other aspects Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items," may indicate the presence of only one item, or may indicate more items. Thus, the term "set" may be equivalent to "one or more" as used herein.

In the following detailed description, numerous specific details are set forth in order to provide a more thorough understanding of the one or more embodiments described herein.

However, it will be apparent to one of ordinary skill in the art that the invention may be practiced without these specific details. In other instances, well-known features have not been described in detail to avoid unnecessarily complicating the description.

The present disclosure is generally drawn to a system and method, according to one or more exemplary embodiments, for a tumbler insert. However, this is non limiting and it should be appreciated that instead of a tumbler another type of cup, bowl, or other vessel may be used. The device secures the vessel from the inside without contacting any exterior surfaces. The device includes a plurality of flexible members or claws that are contractable and conformable when pressed into the interior of the vessel, which creates sufficient tension to secure the holder within the vessel. The holder head is disposed on a stick with a grip which permits manual rotation of a tumbler or vessel for painting and decoration.

Figure 1:
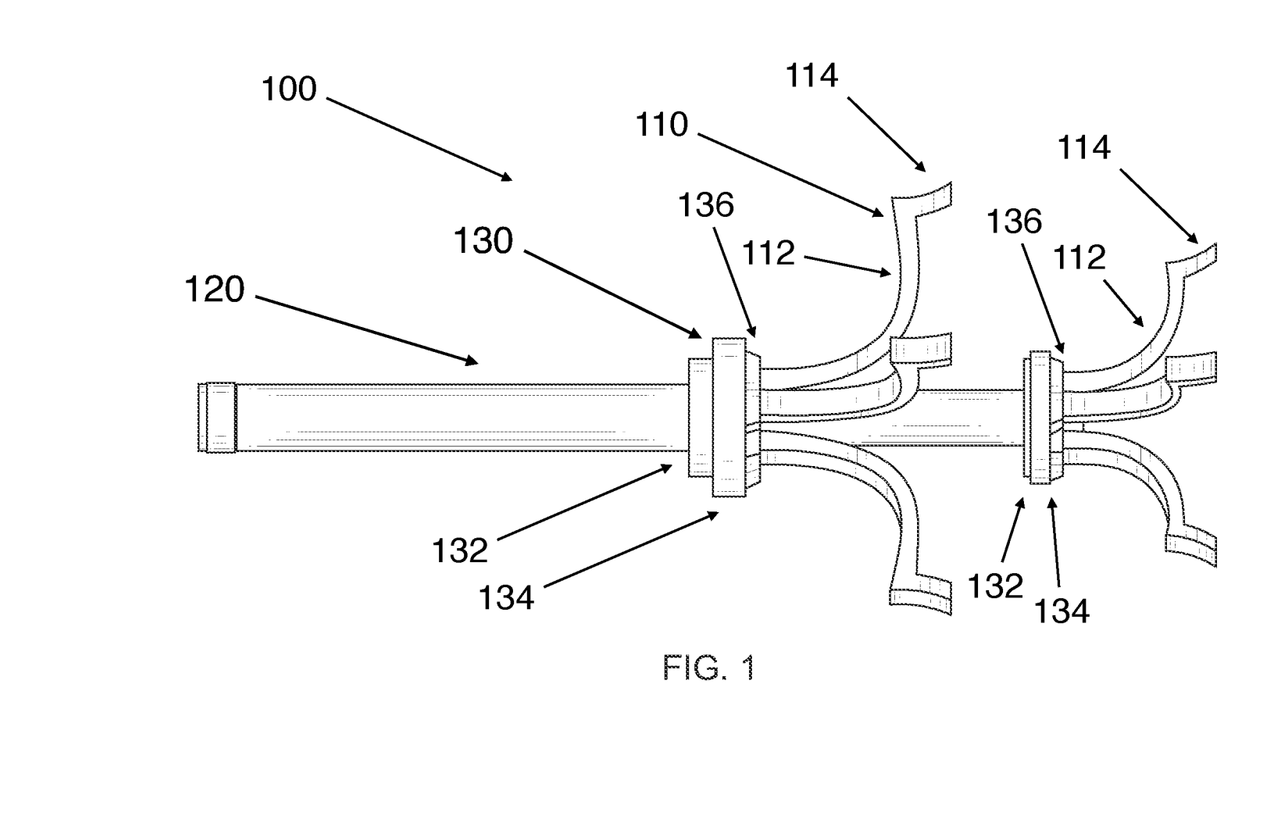
FIG. 1 illustrates one embodiment of a Rotisserie Cup Holder.
Figure 2:
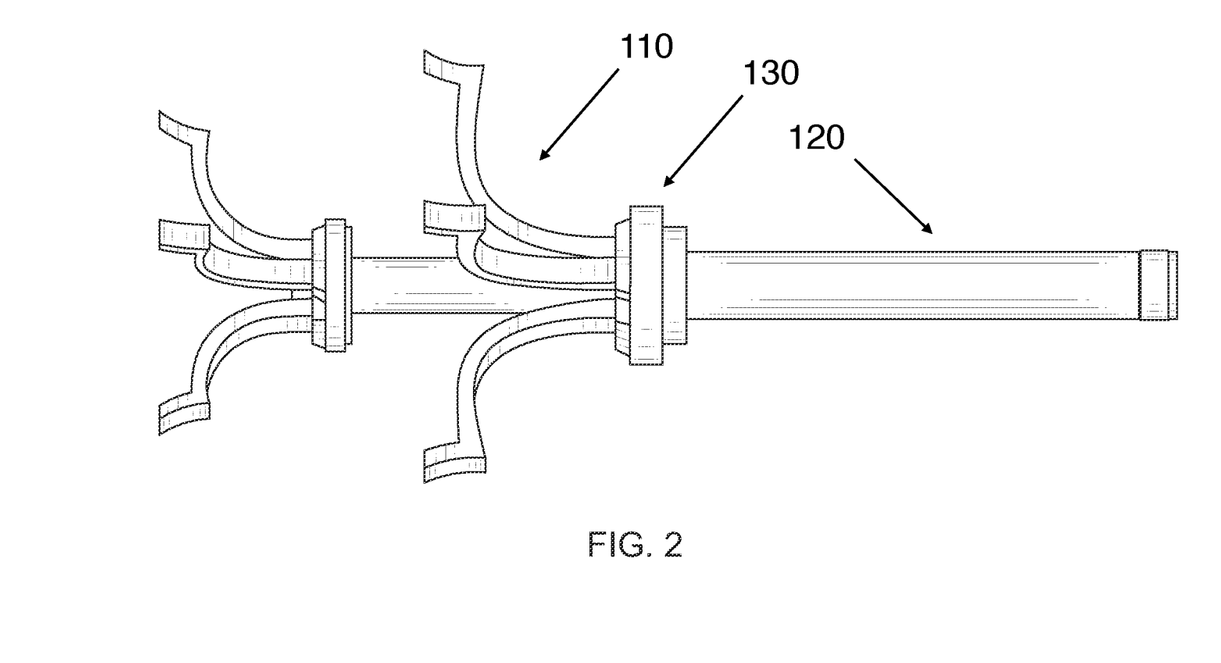
FIG. 2 illustrates another view of the Rotisserie Cup Holder.
Figure 3:
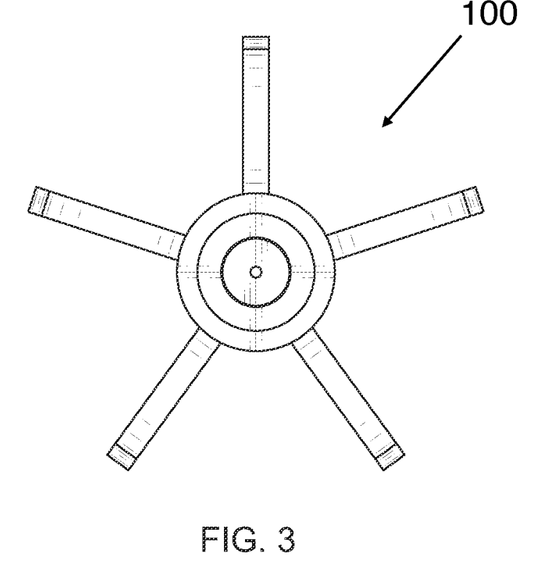
FIG. 3 illustrates another view of the Rotisserie Cup Holder.
Figure 4:
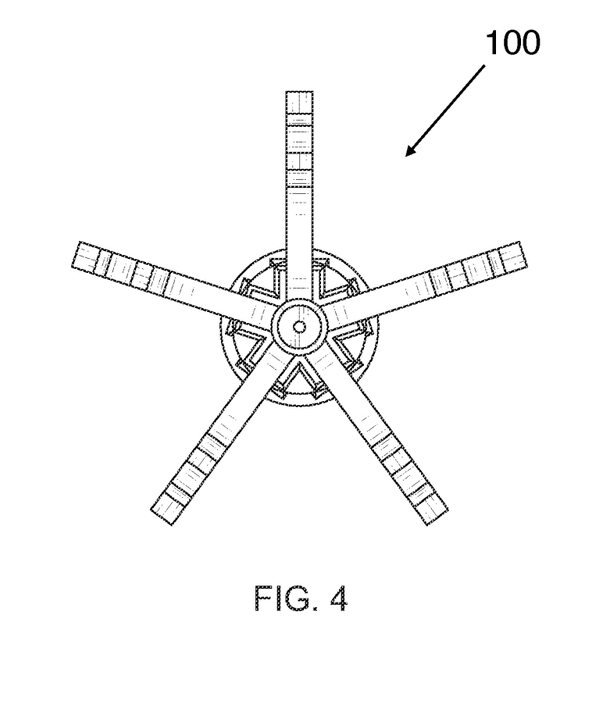
FIG. 4 illustrates another view of the Rotisserie Cup Holder.
Figure 5:
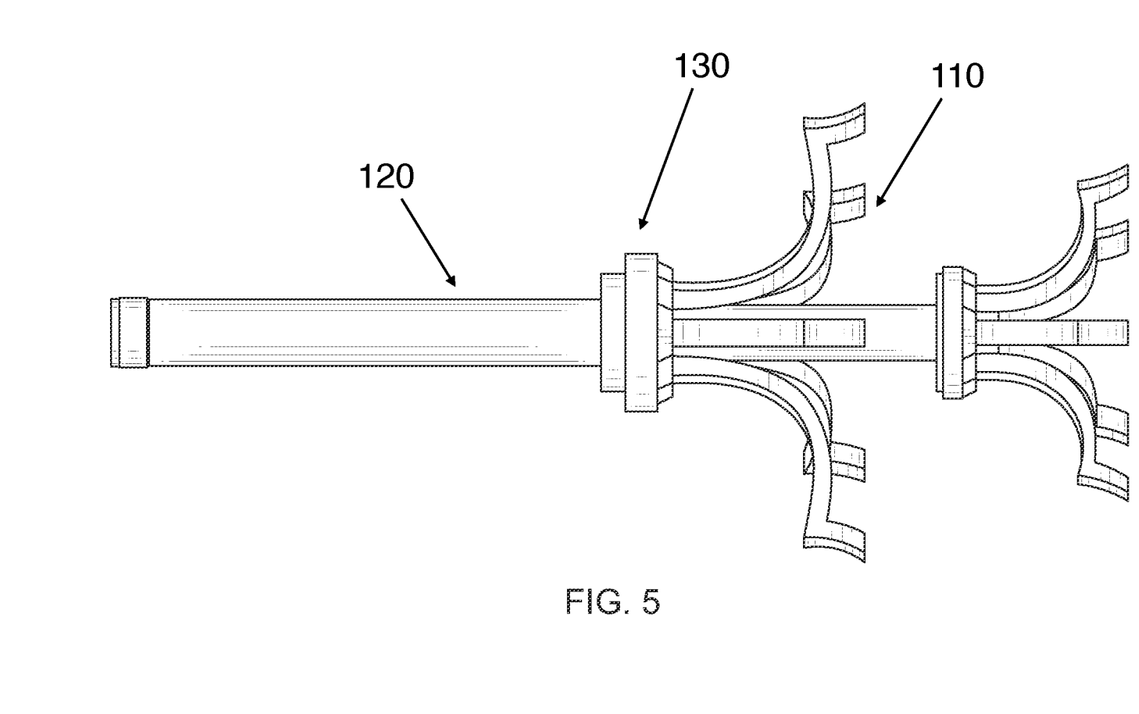
FIG. 5 illustrates another view of the Rotisserie Cup Holder.
Figure 6:
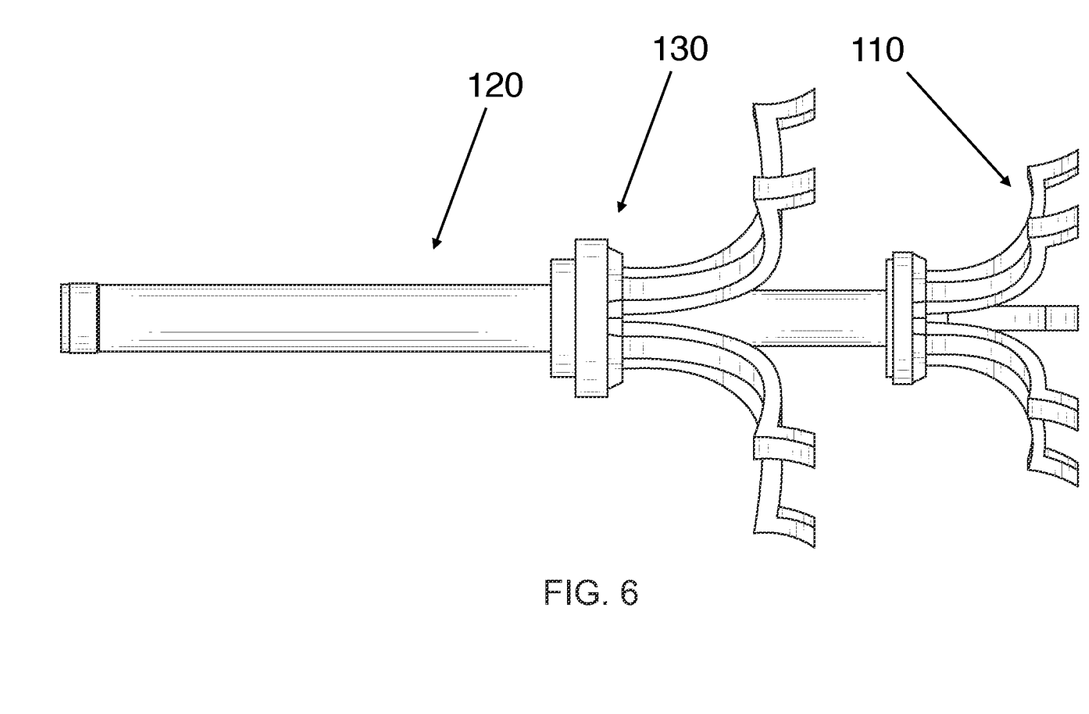
FIG. 6 illustrates another view of the Rotisserie Cup Holder.
Figure 7:
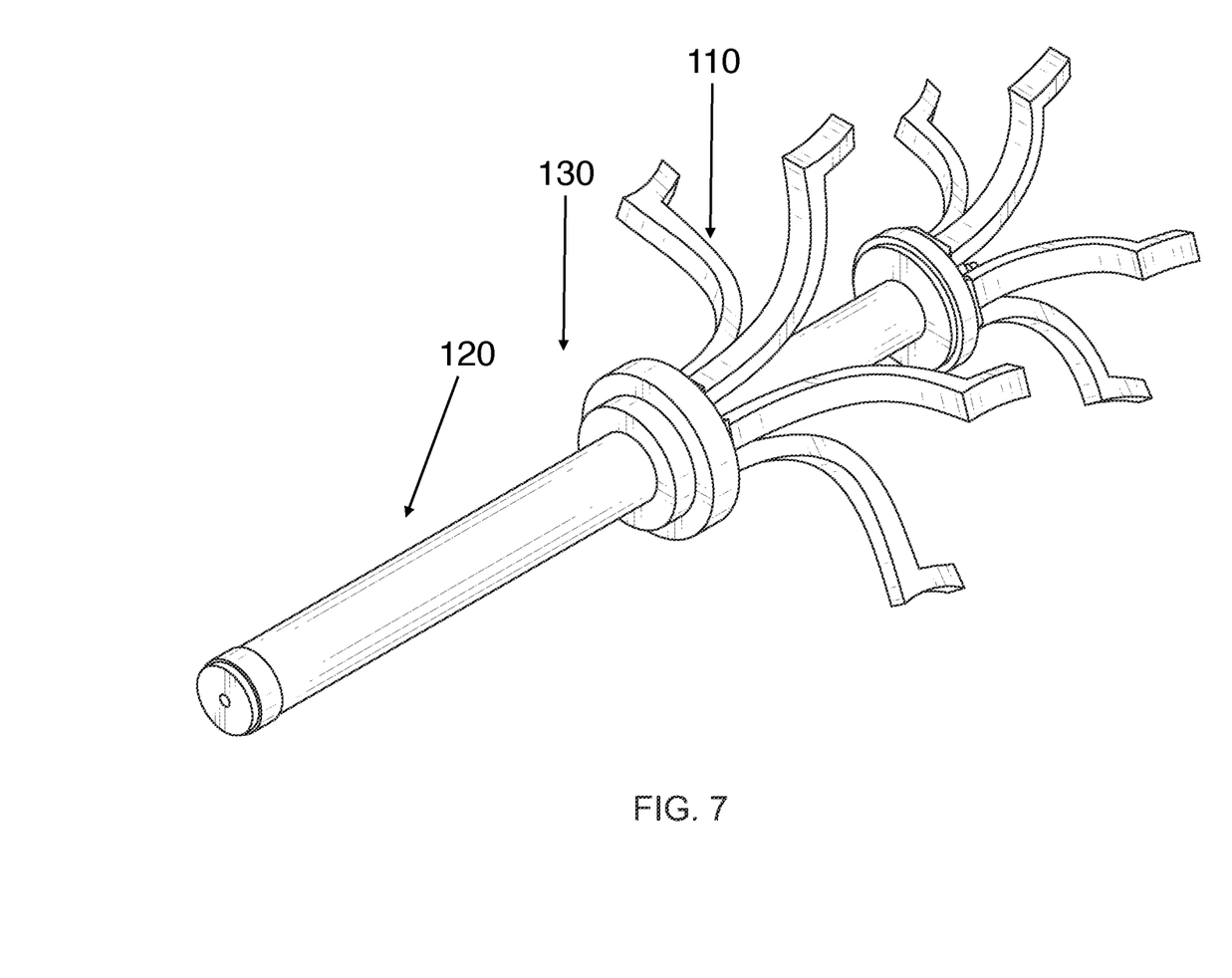
FIG. 7 illustrates another view of the Rotisserie Cup Holder.

With reference now to FIG. 1, one exemplary embodiment of tumbler insert 100 is shown. The main components of tumbler insert include gripping members 110, a rod 120, and holders 130. Rod 120 may be a cylindrical hollow tube designed to be received by the rotisserie or spinning machine such that it rotates in unison along with the machine. Rod 120 in other non-limiting embodiments may be rectangular, triangular, hexagonal, octagonal, or any other shapes suitable to be received by the rotisserie or spinning machine. Rod 120 may be made of PVC, metal, wood, glass, plastics, or carbon fiber.

Holders 130 may have a disc shaped first component 132 positioned next to a disc shaped second component 134 whereby second component 134 may have a larger perimeter than first component 132. First component 132 and second component 134 may each have an inner circular aperture positioned through a center of first component 132 and second component 134 that allows rod 120 to be passed through. Once rod 120 has passed through, holders 130 may have a friction fit to rod 120. Holders 130 may be positioned separately along a length of rod 120. The positioning of a first holder 130 and a second holder 130 may vary depending on the need to support a tumbler.

Holders 130 may have one or more receiving cavities 136 positioned outward from a surface of second component 134 to receive gripping members 110. Receiving cavities 136 may have a specific shape designed to receive gripping members 110. Receiving cavities 136 may be placed equally along a perimeter of the surface of second component 134 whereby they are symmetrical to one another.

Gripping members 110 may be made of a flexible material with a first element 112 and second element 114. In this non-limiting embodiment, there may be four gripping members 110 to each holder 130, however, this number may vary depending on the size and shape of the tumbler. First element 112 has a first end received into receiving cavities 136. First element 112 may have a concave outward facing surface with a center that faces diagonally away from rod 120 and a convex inward facing surface with a center that faces diagonally towards rod 120. Opposite of the first end of first element 112 is second element 114 which extends perpendicular or at an angle away from first element 112 and second component 134. Second element 114 comes into contact with the tumbler and may have an enlarged portion to facilitate gripping to the tumbler. During operation, rod 120 is connected to a rotisserie or spinning machine. Gripping members 110 are bent then pressed into the tumbler, which creates sufficient tension to secure the holder within the tumbler, allowing the tumbler to rotate with rod 120. The tumbler may then be rotated for painting and decoration.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated.

What is claimed is:

1. An insert, the insert comprising: gripping members and a rod that are contractable and conformable to press against an interior of a vessel with a thickened portion at an end of the gripping members, wherein the gripping members are made of a flexible material, wherein the insert further comprises a holder positioned wherein the ripping members extend from the holder wherein the holder is positioned along a length of the rod at a center or near the center of the length of the rod, wherein the gripping members each have a convex surface that faces outward towards the rod, wherein the gripping members each have a contact surface at a bottom end that extends from the convex surface at an angle, wherein the contact surface is a second convex surface facing the rod.

2. The insert of claim 1: wherein there are four gripping members positioned symmetrically around a center of the insert.

3. The insert of claim 1: further comprising second gripping members with a similar configuration to the gripping members.

4. An insert, the insert comprising: a first set of gripping members positioned in a first holder, and a second set of gripping members in a second holder, and a rod, wherein the first holder is at a center of the rod with an aperture therethrough of which the rod extends through, wherein the second holder has an aperture therethrough of which the rod extends through wherein the first set of gripping members and the second set of gripping members are contractable and conformable to press against an interior of a vessel, wherein the first set of gripping members have a first concave surface that extends down from the first holder and faces outward towards the vessel, wherein the second set of gripping members have a concave surface that extends down from the second holder and faces outward towards the vessel.

5. The insert of claim 4: wherein the concave surface on the first set of gripping members is connected perpendicularly to a contact surface that is a convex surface that faces the rod wherein the concave surface on the second set of gripping members is connected perpendicularly to a second contact surface that is a second convex surface that faces the rod.

6. The insert of claim 5: wherein the convex surface on the first set of gripping members is thicker than the concave surface of the first set of gripping members, wherein the convex surface on the second set of gripping members is thicker than the concave surface of the first set of gripping members.

* * * * *